United States Patent
Druml et al.

(10) Patent No.: US 12,472,815 B2
(45) Date of Patent: Nov. 18, 2025

(54) DRIVER AND PASSENGER AWARE CONTENT PROJECTION

(71) Applicant: Infineon Technologies Austria AG, Villach (AT)

(72) Inventors: Norbert Druml, Graz (AT); Martina Schwarz, Graz (AT)

(73) Assignee: Infineon Technologies Austria AG, Villach (AT)

( * ) Notice: Subject to any disclaimer, the term of this patent is extended or adjusted under 35 U.S.C. 154(b) by 116 days.

(21) Appl. No.: 18/351,007

(22) Filed: Jul. 12, 2023

(65) Prior Publication Data

US 2025/0018964 A1    Jan. 16, 2025

(51) Int. Cl.
| | |
|---|---|
| B60Q 1/00 | (2006.01) |
| B60K 35/10 | (2024.01) |
| B60K 35/28 | (2024.01) |
| B60Q 1/04 | (2006.01) |
| B60W 40/08 | (2012.01) |
| B60W 50/14 | (2020.01) |
| B60K 35/23 | (2024.01) |

(52) U.S. Cl.
CPC ............ *B60K 35/10* (2024.01); *B60K 35/285* (2024.01); *B60Q 1/04* (2013.01); *B60W 40/08* (2013.01); *B60W 50/14* (2013.01); *B60K 35/23* (2024.01); *B60K 2360/149* (2024.01); *B60K 2360/334* (2024.01); *B60Q 2400/50* (2013.01); *B60W 2050/143* (2013.01); *B60W 2050/146* (2013.01); *B60W 2540/225* (2020.02); *B60W 2554/4041* (2020.02)

(58) Field of Classification Search
CPC ................ B60W 50/14; B60W 40/08; B60W 2554/4041; B60W 2540/225; B60W 2050/143; B60W 2050/146; B60K 35/00; B60K 2360/149; B60K 35/23; B60K 35/10; B60K 2360/334; B60Q 1/04; B60Q 2400/50
See application file for complete search history.

(56) References Cited

U.S. PATENT DOCUMENTS

| | | | | |
|---|---|---|---|---|
| 7,847,705 B2 * | 12/2010 | Kido | ...................... | B60K 35/70 |
| | | | | 348/148 |
| 9,475,389 B1 * | 10/2016 | Fung | ...................... | B60K 35/81 |
| 9,958,870 B1 * | 5/2018 | Graybill | ................... | G05D 1/02 |
| 10,067,341 B1 * | 9/2018 | Breed | ................... | G06V 20/597 |

(Continued)

FOREIGN PATENT DOCUMENTS

| | | |
|---|---|---|
| CN | 106297098 A | 1/2017 |
| JP | 2012247369 A | 12/2012 |
| JP | 2020006743 A | 1/2020 |

*Primary Examiner* — Quang Pham
(74) *Attorney, Agent, or Firm* — Harrity & Harrity, LLP

(57) ABSTRACT

A vehicle system of a vehicle includes a viewing tracking system configured to monitor a driver viewing direction of a vehicle driver and generate driver viewing direction information that indicates the driver viewing direction of the vehicle driver; and an image projection system configured to receive the driver viewing direction information and project an image into the driver viewing direction of the vehicle driver based on the driver viewing direction information. An image projection direction of the image projection system at which the image is projected varies based on a change in the driver viewing direction of the vehicle driver.

16 Claims, 2 Drawing Sheets

(56) References Cited

U.S. PATENT DOCUMENTS

| | | | | |
|---|---|---|---|---|
| 10,120,992 | B2* | 11/2018 | Shim | G06T 7/73 |
| 10,134,280 | B1* | 11/2018 | You | B60Q 1/525 |
| 10,302,943 | B2* | 5/2019 | Asai | B60K 35/81 |
| 10,336,188 | B2* | 7/2019 | Torii | B60K 35/235 |
| 11,187,553 | B2* | 11/2021 | Cho | G01C 21/365 |
| 11,618,456 | B2* | 4/2023 | Kim | B60W 30/095 |
| | | | | 340/576 |
| 12,097,870 | B2* | 9/2024 | Nagata | B60W 50/14 |
| 12,159,560 | B2* | 12/2024 | Van Wiemeersch | G09G 3/002 |
| 2002/0196201 | A1* | 12/2002 | Rosen | B60K 35/53 |
| | | | | 348/E7.086 |
| 2004/0178894 | A1* | 9/2004 | Janssen | B60K 35/25 |
| | | | | 348/148 |
| 2010/0253526 | A1* | 10/2010 | Szczerba | G08B 21/06 |
| | | | | 340/576 |
| 2016/0082840 | A1* | 3/2016 | Yoshida | B60R 1/28 |
| | | | | 701/36 |
| 2016/0117947 | A1* | 4/2016 | Misu | B60W 50/085 |
| | | | | 434/62 |
| 2016/0144785 | A1* | 5/2016 | Shimizu | G08G 1/167 |
| | | | | 340/435 |
| 2016/0165031 | A1* | 6/2016 | Gopinath | H04W 8/005 |
| | | | | 455/569.2 |
| 2016/0207539 | A1* | 7/2016 | Jung | G02B 27/017 |
| 2016/0342850 | A1* | 11/2016 | Elimalech | G08G 1/0141 |
| 2017/0144591 | A1* | 5/2017 | Yatsu | H04N 9/3185 |
| 2017/0155867 | A1* | 6/2017 | Yokota | B60K 35/235 |
| 2017/0225617 | A1* | 8/2017 | Morimura | G06V 40/10 |
| 2017/0259731 | A1* | 9/2017 | Son | B60Q 1/48 |
| 2017/0269363 | A1* | 9/2017 | Fujita | B60K 35/23 |
| 2017/0269684 | A1* | 9/2017 | Murai | B60K 35/10 |
| 2018/0004020 | A1* | 1/2018 | Kunii | G03B 21/12 |
| 2018/0027374 | A1* | 1/2018 | Wang | H04W 4/021 |
| | | | | 455/456.3 |
| 2018/0033306 | A1* | 2/2018 | Kim | G06V 40/103 |
| 2018/0037162 | A1* | 2/2018 | Yonezawa | G08G 1/0141 |
| 2018/0059773 | A1* | 3/2018 | Park | B60K 35/23 |
| 2018/0086346 | A1* | 3/2018 | Fujisawa | B60R 16/02 |
| 2018/0166061 | A1* | 6/2018 | Kotegawa | G10K 11/1752 |
| 2018/0174460 | A1* | 6/2018 | Jung | G08G 1/16 |
| 2019/0110729 | A1* | 4/2019 | Yamataka | A61B 5/1495 |
| 2019/0256084 | A1* | 8/2019 | Lee | G06V 40/193 |
| 2019/0367050 | A1* | 12/2019 | Victor | G06V 20/597 |
| 2019/0371178 | A1* | 12/2019 | Fukami | G08G 1/166 |
| 2020/0058222 | A1* | 2/2020 | Miyahara | B60Q 1/525 |
| 2020/0156533 | A1* | 5/2020 | Lee | B60Q 1/507 |
| 2020/0225402 | A1* | 7/2020 | Ihas | G02B 6/0046 |
| 2020/0265741 | A1* | 8/2020 | Rhee | G06Q 30/0631 |
| 2020/0284883 | A1* | 9/2020 | Ferreira | G01S 7/4815 |
| 2021/0023994 | A1* | 1/2021 | Watanabe | G06T 7/73 |
| 2021/0162927 | A1* | 6/2021 | Takii | B60Q 1/50 |
| 2021/0199879 | A1* | 7/2021 | Robinson | G02B 6/0048 |
| 2021/0302727 | A1* | 9/2021 | Sugiyama | B60K 35/285 |
| 2021/0309233 | A1* | 10/2021 | Goto | G06V 40/20 |
| 2021/0331587 | A1* | 10/2021 | Kim | B60K 35/28 |
| 2021/0331681 | A1* | 10/2021 | Im | G06F 3/011 |
| 2021/0331706 | A1* | 10/2021 | Kim | B60K 35/80 |
| 2021/0339674 | A1* | 11/2021 | Chen | B60Q 1/0023 |
| 2021/0347374 | A1* | 11/2021 | Stenneth | B60K 35/28 |
| 2021/0403002 | A1* | 12/2021 | Kim | B60W 40/09 |
| 2022/0012988 | A1* | 1/2022 | Avadhanam | G08B 21/22 |
| 2022/0063686 | A1* | 3/2022 | Brooks | B61L 15/0018 |
| 2022/0113539 | A1* | 4/2022 | Koyama | G03B 21/56 |
| 2022/0303668 | A1* | 9/2022 | Summers | H04R 1/288 |
| 2023/0051252 | A1* | 2/2023 | Gaudreau | H04N 13/32 |
| 2023/0066670 | A1* | 3/2023 | Yasuda | B60W 40/08 |
| 2023/0221798 | A1* | 7/2023 | Kim | B60N 2/14 |
| | | | | 345/156 |
| 2023/0311659 | A1* | 10/2023 | Shimura | B60K 35/81 |
| | | | | 701/36 |
| 2023/0314158 | A1* | 10/2023 | Sugawara | B60Q 1/545 |
| | | | | 701/423 |
| 2023/0365151 | A1* | 11/2023 | Isshiki | G06V 40/10 |
| 2023/0398926 | A1* | 12/2023 | Kim | B60Q 9/00 |
| 2024/0054877 | A1* | 2/2024 | Miyahara | G06V 20/56 |
| 2024/0127608 | A1* | 4/2024 | de Mersseman | G06V 10/143 |
| 2024/0127725 | A1* | 4/2024 | Fukuda | B60Q 1/50 |
| 2024/0144821 | A1* | 5/2024 | Teraguchi | G08G 1/096775 |
| 2024/0253558 | A1* | 8/2024 | Washi | H05B 47/16 |
| 2024/0280808 | A1* | 8/2024 | Nishimura | G02B 27/01 |
| 2024/0310628 | A1* | 9/2024 | Van Wiemeersch | H04N 9/3185 |
| 2024/0314276 | A1* | 9/2024 | Van Wiemeersch | H04N 9/3179 |
| 2024/0321152 | A1* | 9/2024 | Van Wiemeersch | G09G 3/002 |
| 2024/0326848 | A1* | 10/2024 | Wachsman | B60K 35/21 |
| 2024/0337838 | A1* | 10/2024 | Hejda | B60K 37/10 |
| 2024/0385435 | A1* | 11/2024 | Nishizawa | G02B 27/0101 |

* cited by examiner

DRIVER AND PASSENGER AWARE CONTENT PROJECTION

BACKGROUND

Vehicular safety is intended to protect individuals and other objects that are located inside and outside a vehicle. Some regulations are being focused an ensuring that drivers and passengers remain aware of their surroundings and are alerted when certain unsafe conditions occur. For example, some regulations are directed to monitoring driver awareness, including driver drowsiness. Other regulations are directed to monitoring objects located outside a vehicle. Depending on certain factors that may occur inside and/or outside the vehicle, an unsafe condition may be present. The driver should be alerted to the unsafe condition.

SUMMARY

In some implementations, a vehicle system of a vehicle includes a viewing tracking system configured to monitor a driver viewing direction of a vehicle driver and generate driver viewing direction information that indicates the driver viewing direction of the vehicle driver; and an image projection system configured to receive the driver viewing direction information and project an image into the driver viewing direction of the vehicle driver based on the driver viewing direction information, wherein an image projection direction of the image projection system at which the image is projected varies based on a change in the driver viewing direction of the vehicle driver.

In some implementations, a method of displaying information during operation of a vehicle includes monitoring a driver viewing direction of a vehicle driver; generating driver viewing direction information that indicates the driver viewing direction of the vehicle driver; and projecting an image into the driver viewing direction of the vehicle driver based on the driver viewing direction information, wherein an image projection direction at which the image is projected varies based on a change in the driver viewing direction of the vehicle driver.

BRIEF DESCRIPTION OF THE DRAWINGS

Implementations are described herein making reference to the appended drawings.

DETAILED DESCRIPTION

Figure 1:
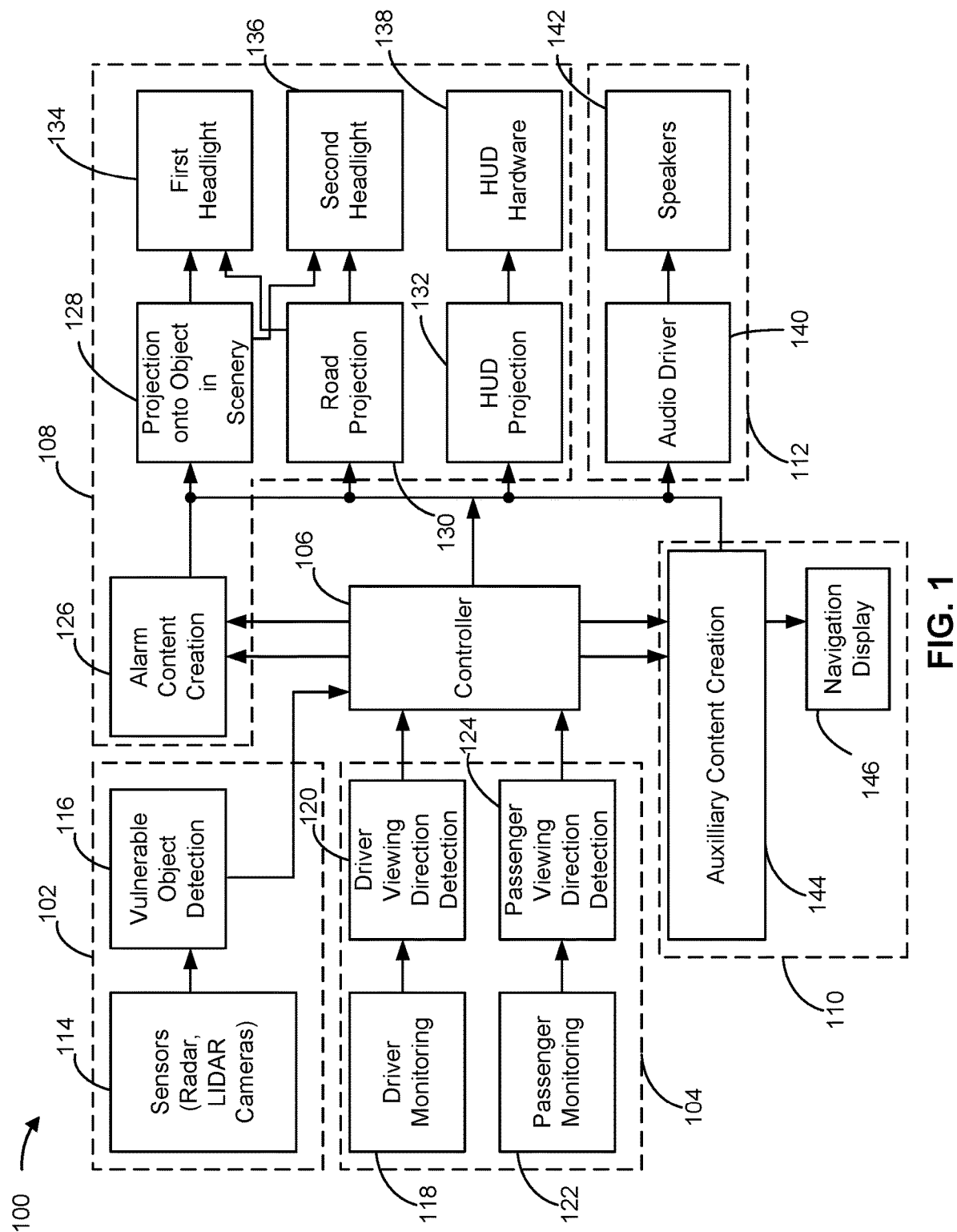
FIG. 1 is a schematic block diagram of a vehicle system according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view, rather than in detail, in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually interchangeable.

Each of the illustrated x-axis, y-axis, and z-axis is substantially perpendicular to the other two axes. In other words, the x-axis is substantially perpendicular to the y-axis and the z-axis, the y-axis is substantially perpendicular to the x-axis and the z-axis, and the z-axis is substantially perpendicular to the x-axis and the y-axis. In some cases, a single reference number is shown to refer to a surface, or fewer than all instances of a part may be labeled with all surfaces of that part. All instances of the part may include associated surfaces of that part despite not every surface being labeled.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling (e.g., any connection or coupling without additional intervening elements) may also be implemented by an indirect connection or coupling (e.g., a connection or coupling with one or more additional intervening elements, or vice versa) as long as the general purpose of the connection or coupling (e.g., to transmit a certain kind of signal or to transmit a certain kind of information) is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, a signal with an approximate signal value may practically have a signal value within 5% of the approximate signal value.

In the present disclosure, expressions including ordinal numbers, such as "first", "second", and/or the like, may modify various elements. However, such elements are not limited by such expressions. For example, such expressions do not limit the sequence and/or importance of the elements. Instead, such expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

Upcoming regulations may require that a driver of a vehicle be monitored for awareness and/or alertness. For example, the driver may be monitored for drowsiness. A drowsy driver is a safety concern that may be result in an accident. Additionally, an unsafe condition may occur outside of the vehicle (e.g., in an environment located outside of the vehicle). For example, a person, animal, or other object may move close to or within an expected driving path of the vehicle. Alternatively, the vehicle may move too close to an object in the environment. An effective method of improving driver awareness and/or alerting the driver to an unsafe condition can improve vehicular safety and reduce a number of accidents.

Some implementations disclosed herein are directed to a vehicle system of a vehicle that includes a viewing tracking system and an image projection system. The viewing tracking system may be configured to monitor a driver viewing direction of a vehicle driver and generate driver viewing direction information that indicates the driver viewing direction of the vehicle driver. The image projection system may be configured to receive the driver viewing direction information and project an image into the driver viewing direction of the vehicle driver based on the driver viewing direction information. An image projection direction of the image projection system at which the image is projected may vary based on a change in the driver viewing direction of the vehicle driver.

The vehicle system may include one or more cameras used to monitor the vehicle driver to detect the driver viewing direction and/or to monitor a vehicle passenger to detect a passenger viewing direction. For example, a camera may be configured to track at least one of a head position of the vehicle driver (e.g., head movement) or an eye position of the vehicle driver (e.g., eye-tracking) for generating the driver viewing direction information. Additionally, or alternatively, a camera may be configured to track at least one of a head position of the vehicle passenger or an eye position of the vehicle passenger for generating passenger viewing direction information.

The image projection system may include a head-up display (HUD) that is configured to project the image onto an image display area of a windshield or side window of the vehicle based on the driver viewing direction information. Additionally, or alternatively, the image projection system may include headlights that include pixel-based light-bulbs capable of projecting black/white content, such as black/white images or videos, onto an image display area of the environment based on the driver viewing direction information. The image display area may be a road surface in front of the vehicle or may be an object detected in the environment.

Additionally, or alternatively, the vehicle system may include an audio system that includes a plurality of speakers including at least one first speaker located on a driver side of the vehicle and at least one second speaker located on a passenger side of the vehicle. The audio system may be configured to output an alarm sound in response to the safety hazard being detected.

Additionally, or alternatively, the viewing tracking system may be configured to monitor a passenger viewing direction of a vehicle passenger and generate passenger viewing direction information that indicates the passenger viewing direction of the vehicle passenger. In this case, the image projection system may be configured to receive the passenger viewing direction information and project a further image into the passenger viewing direction of the vehicle passenger based on the passenger viewing direction information. The passenger image projection direction of the image projection system at which the further image is projected may vary based on a change in the passenger viewing direction of the vehicle passenger. The image projection system may include a HUD for the vehicle passenger that is configured to project the further image onto an image display area of a windshield or side window of the vehicle based on the passenger viewing direction. The vehicle passenger may then alert the vehicle driver of a safety hazard indicated by the further image.

Thus, a system-level combination of driver monitoring and image projection may be used to increase driver alertness.

FIG. 1 is a schematic block diagram of a vehicle system 100 according to one or more implementations. In particular, the vehicle system 100 includes an object detection system 102, a viewing tracking system 104, a controller 106, an image projection system 108, an auxiliary content system 110, and an audio system 112.

The object detection system 102 may include one or more sensors 114 and one or more object detection processors 116. The one or more sensors 114 may be configured to monitor for and sense objects located in the environment. For example, the one or more sensors 114 may include one or more radar sensors, light detection and ranging (LIDAR) sensors, and/or one or more cameras. The one or more sensors 114 may provide sensor signals to the one or more object detection processors 116 for processing and for object detection. For example, the one or more object detection processors 116 may be configured to process the sensor signals, detect an object in the environment based on the sensor signals, and detect a safety hazard based on a position of the object relative to the vehicle. The one or more object detection processors 116 may generate an alarm signal in response to detecting the safety hazard. Thus, the object detection system 102 may be configured to detect an object outside of the vehicle and detect the safety hazard based on a position of the object relative to the vehicle. The object may be a vulnerable object that is determined by the object detection system 102 to be vulnerable to a collision with the vehicle. Additionally, the one or more object detection processors 116 may be configured to generate position information corresponding to the position of the object relative to the vehicle. The image projection system 108 may be configured to generate an image as an alarm pattern in response to the safety hazard being detected by the object detection system 102.

The viewing tracking system 104 may include a driver monitoring device 118 configured to monitor or sense a driver viewing direction of a vehicle driver. The viewing tracking system 104 may further include one or more driver viewing detection processors 120 configured to generate, based on information provided by the driver monitoring device 118, driver viewing direction information that indicates the driver viewing direction of the vehicle driver. In some implementations, the driver monitoring device 118 may be a camera that tracks at least one of a head position of the vehicle driver or an eye position of the vehicle driver for generating the driver viewing direction information. The driver viewing direction information changes, for example, in real-time, as the driver viewing direction changes.

The viewing tracking system 104 may further include a passenger monitoring device 122 configured to monitor or sense a passenger viewing direction of a vehicle passenger. The viewing tracking system 104 may further include one or more passenger viewing detection processors 124 configured to generate, based on information provided by the passenger monitoring device 122, passenger viewing direction information that indicates the passenger viewing direction of the vehicle passenger. In some implementations, the passenger monitoring device 122 may be a camera that tracks at least one of a head position of the vehicle passenger or an eye position of the vehicle passenger for generating the passenger viewing direction information. The passenger viewing direction information changes, for example, in real-time, as the passenger viewing direction changes.

The controller 106 may be configured to receive, as inputs, the alarm signal from the object detection system 102, the position information from the object detection system 102, the driver viewing direction information from the viewing tracking system 104, and the passenger viewing direction information from the viewing tracking system 104, and may control an operation of one or more components of the image projection system 108, the auxiliary content system 110, and/or the audio system 112 based on one or more of the inputs. In some implementations, the controller 106 may be part of the image projection system 108, part of the auxiliary content system 110, and/or part of the audio system 112. For example, the controller 106 may be configured to receive the driver viewing direction information and control one or more components of the image projection system 108 to project an image into the driver viewing direction of the vehicle driver based on the driver viewing direction information. An image projection direction of the image projection system 108 at which the image is projected may vary based on a change in the driver viewing direction of the vehicle driver. Thus, the image projection direction may change in real-time as the driver viewing direction information changes, such that the image projection system 108 projects the image into a line-of-sight of the vehicle driver in order to increase driver awareness. As a result, the vehicle driver may be alerted to a safety hazard and/or driver awareness may be increased.

The image projection system 108 may include an alarm content generator 126 (e.g., an image generator) that is configured to generate the image based on a control signal provided by the controller 106. The image may be an alarm pattern generated in response to the safety hazard being detected. The alarm content generator 126 may be configured to generate one or more different alarm patterns and generate the alarm pattern from among the different alarm patterns based on a type of safety hazard detected by the one or more object detection processors 116. Additionally, the alarm content generator 126 may be configured to provide the image to one or more display drivers based on the control signal. A display driver may be configured to drive an image projector for projecting an image in the image projection direction. Thus, the display driver may provide the image, or electrical signals corresponding to the image, and control signals that control the image projection direction to the image projector.

For example, the image projection system 108 may include a first image driver 128, a second image driver 130, and/or a third image driver 132. The first image driver 128 may be electrically coupled to a first vehicle headlight 134 and a second vehicle headlight 136 of the vehicle. The first vehicle headlight 134 and the second vehicle headlight 136 may be matrix headlights capable of generating the image or a portion of the image, such as an alarm pattern or an alarm symbol. The first image driver 128 may be configured to control the first vehicle headlight 134 and the second vehicle headlight 136 to project the image onto an object that is located in the driver viewing direction. In some implementations, the object may correspond to the safety hazard detected by the object detection system 102. Thus, the image projection system 108 includes the first vehicle headlight 134 and the second vehicle headlight 136 that are configured to project the image onto an image display area of an environment located outside of the vehicle (e.g., onto an object). The image display area of the environment may correspond to the driver viewing direction of the vehicle driver. Additionally, the image display area of the environment may vary based on the change in the driver viewing direction of the vehicle driver.

The second image driver 130 may be electrically coupled to the first vehicle headlight 134 and the second vehicle headlight 136 of the vehicle. The second image driver 130 may be configured to control the first vehicle headlight 134 and the second vehicle headlight 136 to project the image onto a road surface in the driver viewing direction and in front of the vehicle. Thus, the image projection system 108 includes the first vehicle headlight 134 and the second vehicle headlight 136 that are configured to project the image onto an image display area of an environment located outside of the vehicle (e.g., onto the road). The image display area of the environment may correspond to the driver viewing direction of the vehicle driver. Additionally, the image display area of the environment may vary based on the change in the driver viewing direction of the vehicle driver.

The controller 106 may be configured to determine, based on the driver viewing direction information, whether the driver viewing direction of the vehicle driver corresponds to a first angular region of the environment, a second angular region of the environment, or a third angular region of the environment. The second angular region of the environment is arranged between the first angular region and the third angular region of the environment. For example, the first angular region of the environment may correspond to a driver side of the environment, the third angular region of the environment may correspond to a passenger side of the environment, and the second angular region of the environment may correspond to a center region of the environment that is located in front of a center of the vehicle. The controller 106 may control the first image driver 128 and/or the second image driver 130 to activate or drive one or both vehicle headlights based on the driver viewing direction. For example, the first vehicle headlight 134 may be configured by the first image driver 128 or the second image driver 130 to project an entirety of the image, if the driver viewing direction of the vehicle driver corresponds to the first angular region. Thus, the image can be projected into the line-of-sight of the vehicle driver when the vehicle driver is looking into the first angular region. The second vehicle headlight 136 may be configured by the first image driver 128 or the second image driver 130 to project the entirety of the image, if the driver viewing direction of the vehicle driver corresponds to the third angular region. Thus, the image can be projected into the line-of-sight of the vehicle driver when the vehicle driver is looking into the third angular region. The first vehicle headlight 134 may be configured by the first image driver 128 or the second image driver 130 to project a first portion of the image and the second vehicle headlight 136 may be configured by the first image driver 128 or the second image driver 130 to project a second portion of the image, if the driver viewing direction of the vehicle driver corresponds to the second angular region. Thus, the image can be projected into the line-of-sight of the vehicle driver when the vehicle driver is looking into the second angular region.

The third image driver 132 may be electrically coupled to a HUD system 138 of the vehicle. The HUD system 138 may be configured to project the image onto an image display area of a windshield or side window of the vehicle based on the driver viewing direction. The image display area of the windshield or the side window may correspond to the driver viewing direction of the vehicle driver. Thus, the image display area of the windshield or the side window may vary based on the change in the driver viewing direction of the vehicle driver. The HUD system 138 may include HUD hardware, including an image projector and one or more optical components (e.g., lenses) configured to project images onto the windshield or the side window. The HUD hardware may include one or more microelectromechanical system (MEMS) mirrors that are configured to steer the image display area and, thus, steer the image into the driver viewing direction. Thus, the image can be projected onto the windshield or the side window into the line-of-sight of the vehicle driver.

The HUD system 138 may also include an additional HUD hardware configured to project images for the vehicle passenger (e.g., to project images into a line-of-sight of the vehicle passenger). For example, the HUD hardware may include an additional image projector and one or more optical components (e.g., lenses) configured to project images onto the windshield or a side window for the vehicle passenger. The HUD hardware may include one or more MEMS mirrors that are configured to steer an image display area for the vehicle passenger and, thus, steer the image for the vehicle passenger into a passenger viewing direction. Thus, an image can be projected onto the windshield or the side window into the line-of-sight of the vehicle passenger.

The controller 106 may be configured to receive the passenger viewing direction information and control the third image driver 132 to generate a further image (e.g., alarm content provided by the alarm content generator 126) for the vehicle passenger based on the driver viewing direction information. A passenger image projection direction of the further image at which the further image is projected may vary based on a change in the passenger viewing direction of the vehicle passenger. Thus, the passenger image projection direction may change in real-time as the passenger viewing direction information changes. As a result, the HUD system 138 may project the further image into the line-of-sight of the vehicle passenger in order to increase passenger awareness, for example, by alerting the vehicle passenger to a safety hazard using an alarm pattern or an alarm symbol.

The audio system 112 may include an audio driver 140 and a plurality of speakers 142 including at least one first speaker located on a driver side of the vehicle and at least one second speaker located on a passenger side of the vehicle. In some implementations, the plurality of speakers 142 may include front and rear speakers located on each of the driver side and the passenger side of the vehicle. The alarm content generator 126 may provide sound content to the audio driver 140 in response to the safety hazard being detected, and the audio driver 140 may generate electrical signals for producing an alarm sound corresponding to the sound content. Thus, the audio system 112 may be configured to output the alarm sound by activating one or more speakers in response to the safety hazard being detected by the object detection system 102.

In some implementations, the controller 106 and/or the alarm content generator 126 may control the audio driver 140 to activate all of the plurality of speakers in response to the safety hazard being detected. In some implementations, the controller 106 and/or the alarm content generator 126 may control the audio driver 140 to activate only a portion of the plurality of speakers 142 in response to the safety hazard being detected. For example, the controller 106 may use the position information provided by the object detection system 102 to determine which speakers 142 to activate, and the alarm content generator 126 may generate the sound content corresponding to which speakers are to be activated. The audio driver 140 may be configured to activate the at least one first speaker located on the driver side or activate the at least one second speaker located on the passenger side based on the position information received by the controller 106. For example, the audio driver 140 may be configured to activate the at least one first speaker located on the driver side if the position information indicates that the position of the vulnerable object corresponds to the driver side of the vehicle. Alternatively, the audio driver 140 may be configured to activate the at least one second speaker located on the passenger side if the position information indicates that the position of the vulnerable object corresponds to the passenger side of the vehicle. Thus, the vehicle driver's attention may be directed to look in a direction from which the sound is produced in order to increase the vehicle driver's awareness of the safety hazard.

The auxiliary content system 110 may provide additional image or sound content to other auxiliary components in response to the safety hazard being detected. For example, the auxiliary content system 110 may include an auxiliary alarm content generator 144 and a navigation display 146. The auxiliary alarm content generator 144 may be configured to generate an image for display on the navigation display 146 in response to the safety hazard being detected in order to increase the vehicle driver's awareness of the safety hazard.

As indicated above, FIG. 1 is provided as an example. Other examples may differ from what is described with regard to FIG. 1. In practice, the vehicle system 100 may include additional components, fewer components, different components, or differently arranged components than those shown in FIG. 1 without deviating from the disclosure provided above.

Figure 2:
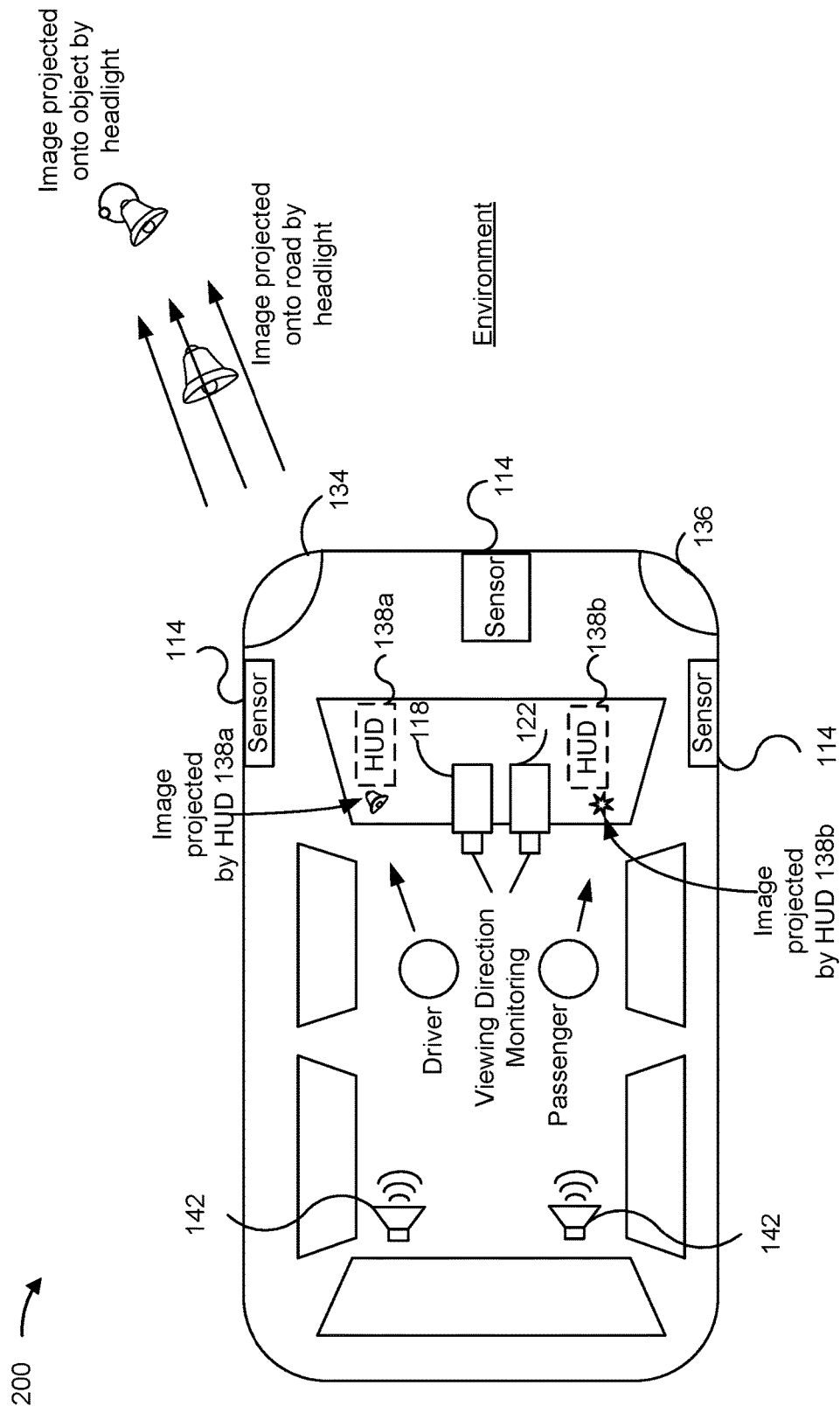
FIG. 2 is a diagram of a vehicle according to one or more implementations.

FIG. 2 is a diagram of a vehicle 200 according to one or more implementations. The vehicle 200 may include the vehicle system 100 described in connection with FIG. 1. For example, the vehicle 200 may include one or more sensors 114, the driver monitoring device 118, the passenger monitoring device 122, the first vehicle headlight 134, the second vehicle headlight 136, a first HUD 138*a* for the vehicle driver, a second HUD 138*b* for the vehicle passenger, and speakers 142. One or more images may be projected into one or more display areas by the first vehicle headlight 134, the second vehicle headlight 136, and/or the first HUD 138*a* based on the driver viewing direction information generated by the viewing tracking system 104 such that the one or more images are projected into the driver viewing direction. Additionally, one or more images may be projected into one or more display areas by the second HUD 138*b* based on the passenger viewing direction information generated by the viewing tracking system 104 such that the one or more images are projected into the passenger viewing direction. In addition, one or more of the speakers 142 may be activated in response to the safety hazard being detected by the object detection system 102.

As indicated above, FIG. 2 is provided as an example. Other examples may differ from what is described with regard to FIG. 2. In practice, the vehicle 200 may include additional components, fewer components, different components, or differently arranged components than those shown in FIG. 2 without deviating from the disclosure provided above.

The following provides an overview of some Aspects of the present disclosure:

Aspect 1: A vehicle system of a vehicle, comprising: a viewing tracking system configured to monitor a driver viewing direction of a vehicle driver and generate driver viewing direction information that indicates the driver viewing direction of the vehicle driver; and an image projection system configured to receive the driver viewing direction information and project an image into the driver viewing direction of the vehicle driver based on the driver viewing direction information, wherein an image projection direction of the image projection system at which the image is projected varies based on a change in the driver viewing direction of the vehicle driver.

Aspect 2: The vehicle system of Aspect 1, wherein the image projection system includes a head-up display that is configured to project the image onto an image display area of a windshield or side window of the vehicle, wherein the image display area of the windshield or the side window corresponds to the driver viewing direction of the vehicle driver, and wherein the image display area of the windshield or the side window varies based on the change in the driver viewing direction of the vehicle driver.

Aspect 3: The vehicle system of Aspect 2, wherein the image projection system includes a first vehicle headlight and a second vehicle headlight that are configured to project the image onto an image display area of an environment located outside of the vehicle, wherein the image display area of the environment corresponds to the driver viewing direction of the vehicle driver, and wherein the image display area of the environment varies based on the change in the driver viewing direction of the vehicle driver.

Aspect 4: The vehicle system of Aspect 3, further comprising: an object detection system configured to detect an object outside of the vehicle and detect a safety hazard based on a position of the object relative to the vehicle, wherein the image is an alarm pattern in response to the safety hazard being detected.

Aspect 5: The vehicle system of Aspect 4, further comprising: an audio system comprising a plurality of speakers including at least one first speaker located on a driver side of the vehicle and at least one second speaker located on a passenger side of the vehicle, wherein the audio system is configured to output an alarm sound in response to the safety hazard being detected.

Aspect 6: The vehicle system of Aspect 5, wherein the audio system is configured to activate the plurality of speakers in response to the safety hazard being detected.

Aspect 7: The vehicle system of Aspect 5, wherein the object detection system is configured to generate position information corresponding to the position of the object relative to the vehicle, wherein the audio system is configured to receive the position information and activate the at least one first speaker or activate the at least one second speaker based on the position information, wherein the audio system is configured to activate the at least one first speaker if the position information indicates that the position of the object corresponds to the driver side of the vehicle, and wherein the audio system is configured to activate the at least one second speaker if the position information indicates that the position of the object corresponds to the passenger side of the vehicle.

Aspect 8: The vehicle system of any of Aspects 1-7, wherein the image projection system includes a first vehicle headlight and a second vehicle headlight that are configured to project the image onto an image display area of an environment located outside of the vehicle, wherein the image display area of the environment corresponds to the driver viewing direction of the vehicle driver, and wherein the image display area of the environment varies based on the change in the driver viewing direction of the vehicle driver.

Aspect 9: The vehicle system of Aspect 8, wherein the image projection system is configured to determine, based on the driver viewing direction information, whether the driver viewing direction of the vehicle driver corresponds to a first angular region of the environment, a second angular region of the environment, or a third angular region of the environment, wherein the second angular region of the environment is arranged between the first angular region and the third angular region of the environment, wherein the first vehicle headlight is configured to project the image, if the driver viewing direction of the vehicle driver corresponds to the first angular region, wherein the second vehicle headlight is configured to project the image, if the driver viewing direction of the vehicle driver corresponds to the third angular region, and wherein the first vehicle headlight is configured to project a first portion of the image and the second vehicle headlight is configured to project a second portion of the image, if the driver viewing direction of the vehicle driver corresponds to the second angular region.

Aspect 10: The vehicle system of Aspect 8, wherein the first vehicle headlight and the second vehicle headlight are matrix headlights.

Aspect 11: The vehicle system of Aspect 8, further comprising: an object detection system configured to detect an object in the environment and detect a safety hazard based on a position of the object relative to the vehicle, wherein the image is an alarm pattern in response to the safety hazard being detected.

Aspect 12: The vehicle system of Aspect 11, wherein the image projection system is configured to project the image of the alarm pattern onto a road surface in front of the vehicle.

Aspect 13: The vehicle system of Aspect 11, wherein the image projection system is configured to project the image of the alarm pattern onto the object.

Aspect 14: The vehicle system of Aspect 11, wherein the object detection system includes at least one of a radar sensor, a lidar sensor, or a camera sensor.

Aspect 15: The vehicle system of any of Aspects 1-14, wherein the viewing tracking system includes a camera that tracks at least one of a head position of the vehicle driver or an eye position of the vehicle driver for generating the driver viewing direction information.

Aspect 16: The vehicle system of any of Aspects 1-15, wherein the viewing tracking system is configured to monitor a passenger viewing direction of a vehicle passenger and generate passenger viewing direction information that indicates the passenger viewing direction of the vehicle passenger, wherein the image projection system is configured to receive the passenger viewing direction information and project a further image into the passenger viewing direction of the vehicle passenger based on the passenger viewing direction information, wherein a passenger image projection direction of the image projection system at which the further image is projected varies based on a change in the passenger viewing direction of the vehicle passenger.

Aspect 17: The vehicle system of Aspect 16, wherein the image projection system includes a head-up display that is configured to project the further image onto an image display area of a windshield or side window of the vehicle, wherein the image display area of the windshield or the side window corresponds to the passenger viewing direction of the vehicle passenger, and wherein the image display area of the windshield or the side window varies based on the change in the passenger viewing direction of the vehicle passenger.

Aspect 18: The vehicle system of Aspect 17, further comprising: an object detection system configured to detect an object located outside of the vehicle and detect a safety hazard based on a position of the object relative to the vehicle, wherein the further image is an alarm pattern in response to the safety hazard being detected.

Aspect 19: A method of displaying information during operation of a vehicle, the method comprising: monitoring a driver viewing direction of a vehicle driver; generating driver viewing direction information that indicates the driver viewing direction of the vehicle driver; and projecting an image into the driver viewing direction of the vehicle driver based on the driver viewing direction information, wherein an image projection direction at which the image is projected varies based on a change in the driver viewing direction of the vehicle driver.

Aspect 20: The method of Aspect 19, further comprising: detecting an object in an environment located outside of the vehicle; detecting a safety hazard based on a position of the object relative to the vehicle; and generating the image as an alarm pattern in response to the safety hazard being detected.

Aspect 21: A system configured to perform one or more operations recited in one or more of Aspects 1-20.

Aspect 22: An apparatus comprising means for performing one or more operations recited in one or more of Aspects 1-20.

Aspect 23: A non-transitory computer-readable medium storing a set of instructions, the set of instructions comprising one or more instructions that, when executed by a device, cause the device to perform one or more operations recited in one or more of Aspects 1-20.

Aspect 24: A computer program product comprising instructions or code for executing one or more operations recited in one or more of Aspects 1-20.

The foregoing disclosure provides illustration and description, but is not intended to be exhaustive or to limit the implementations to the precise form disclosed. Modifications and variations are possible in light of the above disclosure or may be acquired from practice of the implementations.

Some implementations may be described herein in connection with thresholds. As used herein, "satisfying" a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As used herein, the term "component" is intended to be broadly construed as hardware, firmware, or a combination of hardware and software. Systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein, refers to any of the foregoing structures or any other structure suitable for implementation of the techniques described herein. Software may be stored on a non-transitory computer-readable medium such that the non-transitory computer readable medium includes program code or a program algorithm stored thereon that, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal, further information. "Signal conditioning," as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation, and any other processes required to make a signal suitable for processing after conditioning.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a and b, a and c, b and c, and a, b, and c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A vehicle system of a vehicle, comprising:
   a viewing tracking system configured to monitor a driver viewing direction of a vehicle driver and generate driver viewing direction information that indicates the driver viewing direction of the vehicle driver; and
   an image projection system configured to receive the driver viewing direction information and project an image into the driver viewing direction of the vehicle driver based on the driver viewing direction information, wherein an image projection direction of the image projection system at which the image is projected varies based on a change in the driver viewing direction of the vehicle driver,
   wherein the image projection system includes a first vehicle headlight and a second vehicle headlight that are configured to project the image onto an image display area of an environment located outside of the vehicle,
   wherein the image display area of the environment corresponds to the driver viewing direction of the vehicle driver,
   wherein the image display area of the environment varies based on the change in the driver viewing direction of the vehicle driver,
   wherein the image projection system is configured to determine, based on the driver viewing direction information, whether the driver viewing direction of the vehicle driver corresponds to a first angular region of the environment, a second angular region of the environment, or a third angular region of the environment, wherein the second angular region of the environment is arranged between the first angular region and the third angular region of the environment,
   wherein the first vehicle headlight is configured to project the image, if the driver viewing direction of the vehicle driver corresponds to the first angular region,
   wherein the second vehicle headlight is configured to project the image, if the driver viewing direction of the vehicle driver corresponds to the third angular region, and
   wherein the first vehicle headlight is configured to project a first portion of the image and the second vehicle headlight is configured to project a second portion of the image, if the driver viewing direction of the vehicle driver corresponds to the second angular region.

2. The vehicle system of claim 1, wherein the image projection system includes a head-up display that is configured to project a further image onto an image display area of a windshield or side window of the vehicle,
   wherein the image display area of the windshield or the side window corresponds to the driver viewing direction of the vehicle driver, and
   wherein the image display area of the windshield or the side window varies based on the change in the driver viewing direction of the vehicle driver.

3. The vehicle system of claim 1, wherein the first vehicle headlight and the second vehicle headlight are matrix headlights.

4. The vehicle system of claim 1, further comprising:
   an object detection system configured to detect an object in the environment and detect a safety hazard based on a position of the object relative to the vehicle,
   wherein the image is an alarm pattern in response to the safety hazard being detected.

5. The vehicle system of claim 4, wherein the image projection system is configured to project the image of the alarm pattern onto a road surface in front of the vehicle.

6. The vehicle system of claim 4, wherein the image projection system is configured to project the image of the alarm pattern onto the object.

7. The vehicle system of claim 4, wherein the object detection system includes at least one of a radar sensor, a lidar sensor, or a camera sensor.

8. The vehicle system of claim 4, further comprising:
   an audio system comprising a plurality of speakers including at least one first speaker located on a driver side of the vehicle and at least one second speaker located on a passenger side of the vehicle,
   wherein the audio system is configured to output an alarm sound in response to the safety hazard being detected.

9. The vehicle system of claim 8, wherein the audio system is configured to activate the plurality of speakers in response to the safety hazard being detected.

10. The vehicle system of claim 8, wherein the object detection system is configured to generate position information corresponding to the position of the object relative to the vehicle,
    wherein the audio system is configured to receive the position information and activate the at least one first speaker or activate the at least one second speaker based on the position information, wherein the audio system is configured to activate the at least one first speaker if the position information indicates that the position of the object corresponds to the driver side of the vehicle, and wherein the audio system is configured to activate the at least one second speaker if the position information indicates that the position of the object corresponds to the passenger side of the vehicle.

11. The vehicle system of claim 1, wherein the viewing tracking system includes a camera that tracks at least one of a head position of the vehicle driver or an eye position of the vehicle driver for generating the driver viewing direction information.

12. The vehicle system of claim 1, wherein the viewing tracking system is configured to monitor a passenger viewing direction of a vehicle passenger and generate passenger viewing direction information that indicates the passenger viewing direction of the vehicle passenger, wherein the image projection system is configured to receive the passenger viewing direction information and project a further image into the passenger viewing direction of the vehicle passenger based on the passenger viewing direction information, wherein a passenger image projection direction of the image projection system at which the further image is projected varies based on a change in the passenger viewing direction of the vehicle passenger, and wherein the image projection system is configured to align the passenger image projection direction of the image projection system at which the further image is projected with the passenger viewing direction such that the further image is projected directly into a line-of-sight of the vehicle passenger.

13. The vehicle system of claim 12, wherein the image projection system includes a head-up display that is configured to project the further image onto an image display area of a windshield or side window of the vehicle, wherein the image display area of the windshield or the side window corresponds to the passenger viewing direction of the vehicle passenger, and wherein the image display area of the windshield or the side window varies based on the change in the passenger viewing direction of the vehicle passenger.

14. The vehicle system of claim 13, further comprising:
an object detection system configured to detect an object located outside of the vehicle and detect a safety hazard based on a position of the object relative to the vehicle, wherein the further image is an alarm pattern in response to the safety hazard being detected.

15. A method of displaying information during operation of a vehicle, the method comprising:

monitoring a driver viewing direction of a vehicle driver;
generating driver viewing direction information that indicates the driver viewing direction of the vehicle driver; and
projecting an image into the driver viewing direction of the vehicle driver based on the driver viewing direction information, wherein an image projection direction at which the image is projected varies based on a change in the driver viewing direction of the vehicle driver, wherein projecting the image into the driver viewing direction of the vehicle driver comprises:
aligning the image projection direction at which the image is projected with the driver viewing direction such that the image is projected directly into a line-of-sight of the vehicle driver;
projecting the image onto an image display area of an environment located outside of the vehicle using at least one of a first vehicle headlight or a second vehicle headlight, wherein the image display area of the environment varies based on the change in the driver viewing direction of the vehicle driver;
determining, based on the driver viewing direction information, whether the driver viewing direction of the vehicle driver corresponds to a first angular region of the environment, a second angular region of the environment, or a third angular region of the environment, wherein the second angular region of the environment is arranged between the first angular region and the third angular region of the environment;
projecting, by the first vehicle headlight, the image, if the driver viewing direction of the vehicle driver corresponds to the first angular region;
projecting, by the second vehicle headlight, the image, if the driver viewing direction of the vehicle driver corresponds to the third angular region; and
projecting, by the first vehicle headlight and the second vehicle headlight, the image, if the driver viewing direction of the vehicle driver corresponds to the second angular region, wherein the first vehicle headlight is configured to project a first portion of the image and the second vehicle headlight is configured to project a second portion of the image.

16. The method of claim 15, further comprising:
detecting an object in an environment located outside of the vehicle;
detecting a safety hazard based on a position of the object relative to the vehicle; and
generating the image as an alarm pattern in response to the safety hazard being detected.

* * * * *